Patented May 15, 1934

1,958,479

UNITED STATES PATENT OFFICE 1,958,479

ADHESIVE

Eardley Hazell, New York, N. Y., and Harry F. Stowe, Rutherford, N. J., assignors to The Naugatuck Chemical Company, Naugatuck, Conn., a corporation of Connecticut No Drawing. Application February 15, 1930, Serial No. 428,824

2 Claims. (Cl. 87—17)

This invention relates to adhesives.

It is the object of this invention to provide an adhesive which may be employed to unite rubber to other substances, such other substances including rubber and rubber-like materials and leather and similar materials.

The adhesive of this invention is such as will secure rubber, whether the rubber be unvulcanized or vulcanized, whether the rubber be compounded or uncompounded, whether the compounding ingredients, if any, in the rubber be vegetable, mineral, fibrous or non-fibrous, or any of the other usual fillers in rubber, whether the rubber be mechanically treated as by milling or be heat treated or be rubber laid down directly from latex. The adhesive of this invention is especially applicable for securing vulcanized rubber to vulcanized rubber and for securing vulcanized rubber to leather and for securing compositions containing vulcanized rubber such as are used for rubber shoe soles to leather.

The adhesive of this invention is also useful for securing compositions consisting partly or in whole of reclaimed rubber to other materials.

Other objects and advantages will appear in the following detailed description.

According to this invention in its broadest aspects, the adhesive comprises a rubber solution with which is mixed comminuted chrome-tanned leather.

The following is given in illustration of the invention but is not to be construed as limiting thereof. Suitable proportions of the ingredients of this invention are as follows:

| | Parts by weight |
|---|---|
| Rubber | 100 |
| Zinc oxide | 2 |
| Dibenzylamine | 2 |
| Sulphur | 2 |
| Comminuted chrome-tanned leather | 30 |

The above ingredients are mixed together on the mill according to the usual milling practice, the order of mixing the ingredients being such as suits the convenience of the operator so long as vulcanization of the rubber mix does not take place on the mill. Such a mixture of materials is then dispersed in a suitable organic solvent, such as benzene or gasoline, or any of the like organic solvents used for a carrier medium for rubber, in the proportion of one pound of the compound to one gallon of the solution.

The adhesive prepared as above described may then be employed for securing rubber to rubber, or rubber to leather, by simply spreading the adhesive over the surfaces to be brought in contact and pressing the surfaces together and vulcanizing. With the vulcanizing ingredients of the above described cement, vulcanization may be effected by heating to a vulcanizing temperature of approximately 240° F. for an hour or more.

In the use of the above described cement for securing rubber to leather, it is preferred to prepare the cement with such vulcanizing ingredients that it will vulcanize at ordinary room temperatures so as to render unnecessary the application of heat at a high temperature to the leather which will be detrimental thereto. Accordingly, a second cement may be prepared composed of 100 parts of rubber having mixed therewith two parts of either dibutyl dixanthic disulphide or zinc butyl xanthogenate, which mixture is dissolved in a suitable solvent such as benzene or gasoline in the proportion of one pound of the compound to one gallon of the solvent.

In employing the adhesive of this invention where low temperature vulcanization is sought, the cement first described is mixed with the last described cement in equal proportions just before the application of the adhesive to the article. The adhesive composed of the blended cements is then applied in the usual manner and the parts with the adhesive thereon are then brought into contact under pressure at room temperature for several hours under which conditions the rubber of the cement vulcanizes.

For purposes of illustration the comminuted chrome tanned leather consists of fibres of 1 to 24 microns in length, mostly of the greater length, and 1½ to 1 microns in thickness.

It is not intended so to limit the invention inasmuch as particle size and the proportion of ingredient in the formula may be varied without departing from the invention and other filler materials of small particle size and of an anisotropic particle shape may be employed in addition to that named. The particular ingredients employed for effecting vulcanization of the cement may be varied, as is apparent to one skilled in the art. Alternatively, the vulcanizing ingredients may be applied by spreading a separate solution containing the vulcanizing ingredients over the surfaces to be united, which vulcanizing ingredients will unite with the rubber by diffusion or migration. Other variations in the details of this invention will be apparent to those skilled in the art, all of which are included in the scope of the invention as defined in the following claims.

Having thus described our invention, what we claim and desire to protect by Letters Patent is:

1. As an adhesive a solution of rubber in an organic solvent in admixture with comminuted chrome-tanned leather.

2. As an adhesive a solution of rubber in an organic solvent in admixture with comminuted chrome-tanned leather and vulcanizing ingredients.

EARDLEY HAZELL.
HARRY F. STOWE.